United States Patent
Ronchi et al.

(10) Patent No.: US 10,365,367 B2
(45) Date of Patent: Jul. 30, 2019

(54) 4D DATA ULTRASOUND IMAGING SYSTEM AND CORRESPONDING CONTROL PROCESS

(71) Applicant: General Electric Company, Schenectady, NY (US)

(72) Inventors: Daniele Ronchi, Maslianico (IT); Marco Terenzi, Pavia (IT)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1689 days.

(21) Appl. No.: 13/928,951

(22) Filed: Jun. 27, 2013

(65) Prior Publication Data

US 2014/0036620 A1    Feb. 6, 2014

Related U.S. Application Data

(63) Continuation-in-part of application No. PCT/EP2011/006556, filed on Dec. 23, 2011.

(30) Foreign Application Priority Data

Dec. 28, 2010  (IT) .............................. MI2010A2432

(51) Int. Cl.
*G01S 15/00* (2006.01)
*G01S 15/89* (2006.01)
*G01S 7/52* (2006.01)

(52) U.S. Cl.
CPC ...... *G01S 15/8925* (2013.01); *G01S 7/52023* (2013.01); *G01S 15/8927* (2013.01); *G01S 15/8993* (2013.01); *G01S 15/8918* (2013.01)

(58) Field of Classification Search
USPC ......................................................... 367/11
See application file for complete search history.

(56) References Cited

U.S. PATENT DOCUMENTS 4,131,022 A * 12/1978 Mezrich .......................... 73/606
4,245,250 A *  1/1981 Tiemann ............. G01S 7/52044
                                                   342/185

(Continued)

FOREIGN PATENT DOCUMENTS

CN    1575772 A     2/2005
CN    101745501    6/2010
JP    2005143640 A  6/2005

OTHER PUBLICATIONS

Bernard Savord, and Rod Solomon, "Fully Sampled Matrix Transducer for Real Time 3D Ultrasonic Imaging", 2003 IEEE Ultrasonics Symposium; IEEE Conference Publications, vol. 1, pp. 945-953.

(Continued)

*Primary Examiner* — James R Hulka
(74) *Attorney, Agent, or Firm* — McAndrews, Held & Malloy, Ltd.; Jacob Groethe; David Bates

(57) ABSTRACT

An embodiment of a 4D data ultrasound imaging system includes a matrix of transducer elements suitable for transmitting and for receiving ultrasound signals, said transducer elements being divided into sub-matrixes suitable for receiving in a delayed way a same acoustic signal, a plurality of reception channels with one of said reception channels being associated with one of said transducer elements, a beamformer device including a plurality of storage cells arranged in re-phasing matrixes, each re-phasing matrix being associated with a corresponding sub-matrix with each row associated with one of said transducer elements, said storage cells including an input storage stage that is selectively associated with a row and a reading output stage that is selectively associated with a buffer; each storage cell that belongs to a same column has the input stage that is dynamically activated in sequential times with respect to another storage cell of the same column for storing the same (Continued)

delayed acoustic signal, said storage cells that belong to the same column have the output stage that is simultaneously activated.

21 Claims, 10 Drawing Sheets

(56) References Cited

U.S. PATENT DOCUMENTS

| | | | | |
|---|---|---|---|---|
| 4,722,345 | A * | 2/1988 | Ueno | G01S 7/52063 |
| | | | | 348/163 |
| 4,817,434 | A | 4/1989 | Anderson | |
| 6,126,602 | A | 10/2000 | Savord et al. | |
| 6,589,180 | B2 * | 7/2003 | Erikson et al. | 600/459 |
| 6,705,995 | B1 * | 3/2004 | Poland et al. | 600/447 |
| 7,362,639 | B2 * | 4/2008 | Takahashi | 365/222 |
| 7,477,186 | B2 * | 1/2009 | Camp, Jr. | G01S 19/30 |
| | | | | 341/156 |
| 7,508,113 | B2 * | 3/2009 | Daft et al. | 310/319 |
| 7,527,591 | B2 * | 5/2009 | Haugen et al. | 600/447 |
| 7,527,592 | B2 * | 5/2009 | Haugen et al. | 600/447 |
| 2005/0261589 | A1 | 11/2005 | Daft et al. | |
| 2006/0114735 | A1 | 6/2006 | Takahashi | |
| 2007/0080856 | A1 * | 4/2007 | Camp, Jr. | G01S 19/30 |
| | | | | 342/357.77 |

OTHER PUBLICATIONS

Karaman Mustafa et al; "VLSI Circuits for Adaptive Digital Beamforming in Ultrasound Imaging"; IEEE Transactions on Medicla Imaging, IEEE Service Center, Piscataway, NJ, US, vol. 12, n.4, Dec. 1, 1993; 10 pages.

International Search Report for PCT application No. PCT/EP2011/006556; dated Mar. 1, 2012, Rijswijk, Holland; 4 pages.

Chinese Office Action, Application No. 201180057823.2, dated Sep. 1, 2014, 5 pages.

* cited by examiner

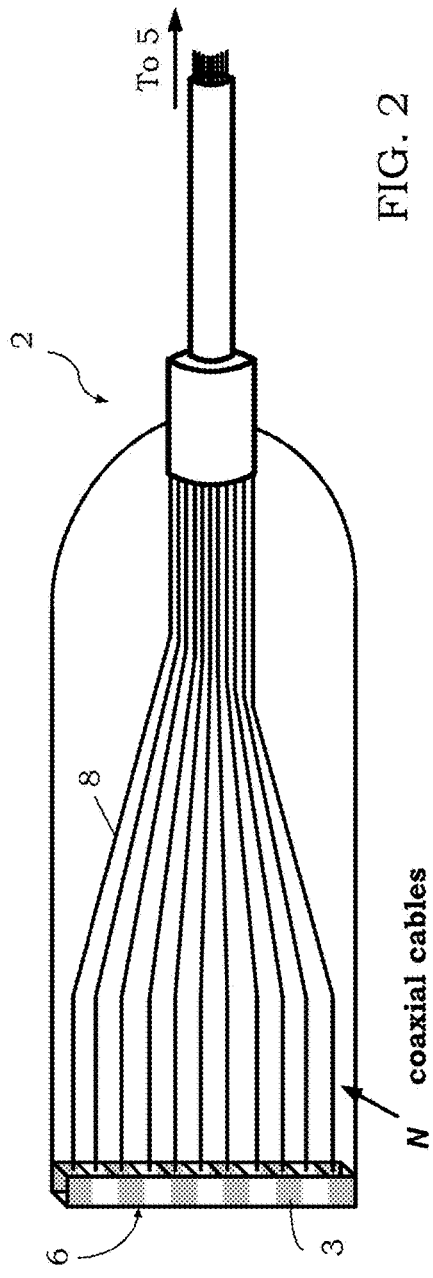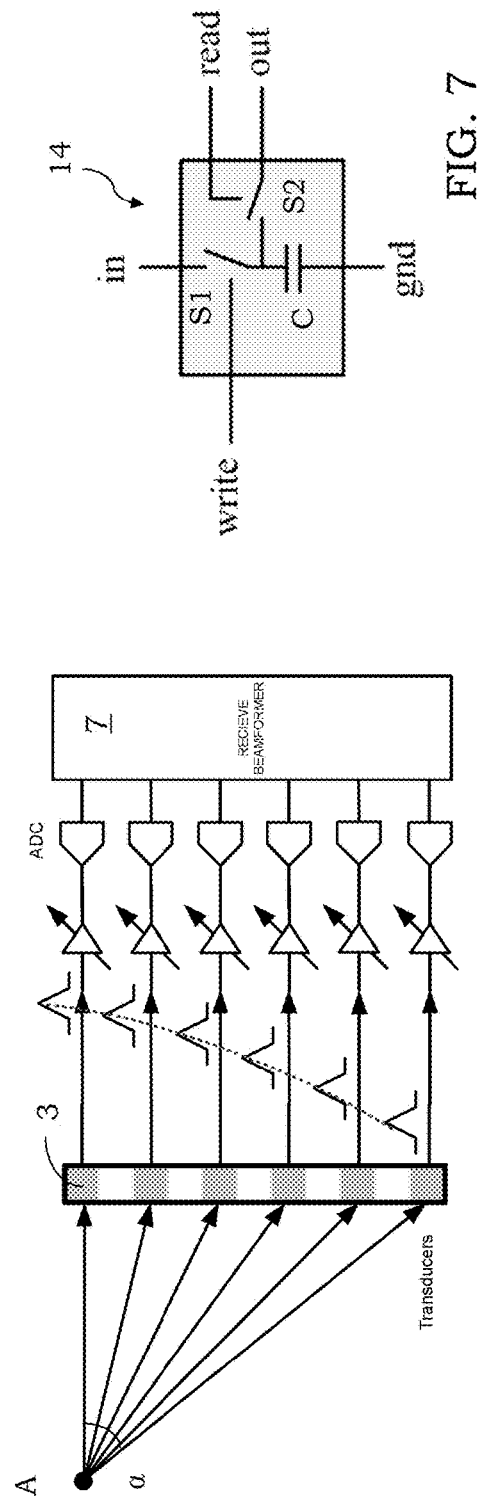

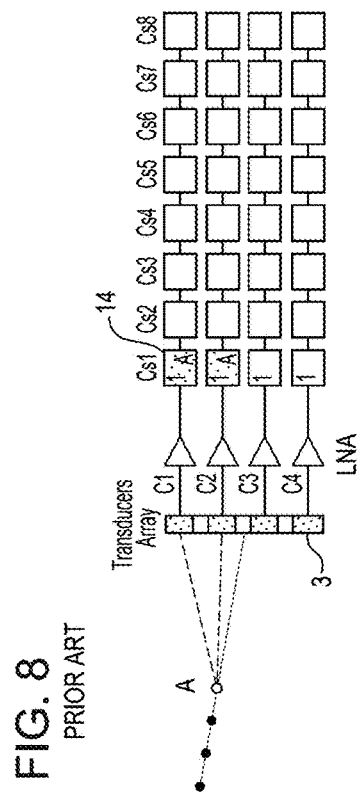
FIG. 8 PRIOR ART
FIG. 9 PRIOR ART
FIG. 10 PRIOR ART
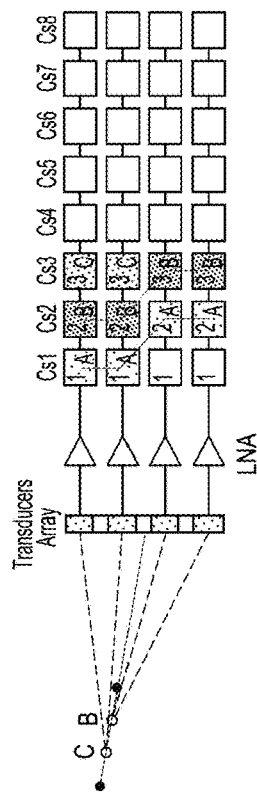
FIG. 11 PRIOR ART

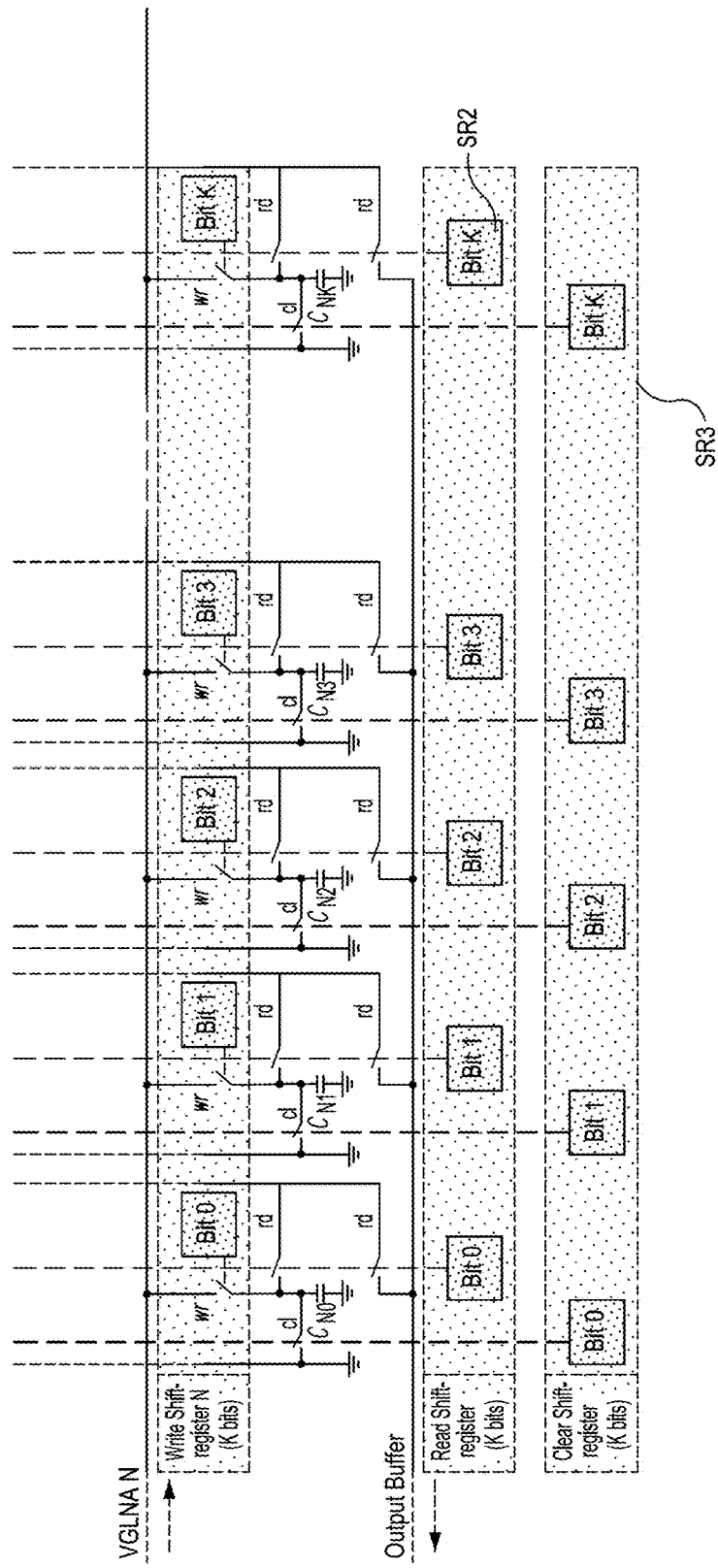

4D DATA ULTRASOUND IMAGING SYSTEM AND CORRESPONDING CONTROL PROCESS

PRIORITY CLAIM

The present application is a Continuation in Part of copending International Patent Application Serial No. PCT/EP2011/006556, filed Dec. 23, 2011; which claims the benefit of Italian Patent Application Serial No. MI2010A002432, filed Dec. 28, 2010, all of the foregoing applications are incorporated herein by reference in their entireties.

TECHNICAL FIELD

An embodiment relates to a 4D data ultrasound imaging system.

More in particular, an embodiment relates to a system including a first matrix of transducer elements suitable for transmitting and for receiving ultrasound signals, the transducer elements being divided into sub-matrices suitable for receiving, in a delayed way, a same acoustic signal, and a plurality of reception channels with a reception channel associated with one of said transducer elements.

The system also includes a beamformer device including a plurality of cells arranged in second re-phasing matrices, each second matrix being associated with a corresponding sub-matrix of transducer elements with each row associated with one of said transducer elements through a reception channel, the cells including a storage input stage that is selectively associated with a row and a reading output stage that is selectively associated with a buffer.

An embodiment also relates to a process for controlling a 4D data ultrasound imaging system.

BACKGROUND

As it is well known, the systems of imaging medical diagnostic testing such as echography and ultrasonography, which are widely used in the surgical and radiological fields, use ultrasonic or ultrasound waves and are based on the principle of the transmission of the ultrasounds and of the echo emission.

A diagnostic apparatus or an ultrasound imaging system includes three parts, as shown in FIG. 1:

- a probe 2 that is maintained in direct contact with the skin of the subject and that includes at least one transducer element 3 suitable for transmitting and for receiving an ultrasound signal;
- a electronic system 4 that drives the transducer element 3 for generating pulse ultrasound signals to be transmitted and that receives a return echo signal at the probe of this pulse, in consequence treating the echo signal received; and
- a displaying system 5 of a corresponding echographic image processed by a computer and shown on a monitor starting from the echo signal received by the probe.

The ultrasounds that are generally used are between approximately 1 and 20 MHz and can be generated by a piezoceramic crystal inserted in the probe.

In FIG. 1 the probe 2, in a simplified scheme, includes a linear array 6, or 1D array, of transducer elements 3.

In particular, the electronic system 4 includes a transmission channel that applies a voltage signal to each transducer element 3 of the probe 2 and that includes a beamformer device, a pulse generator, and a high-voltage transmitting circuit placed in cascade with each other. The transducer element 3 receives the electronic voltage signal and generates, in response to the voltage signal, a respective ultrasound pressure signal or acoustic signal.

The electronic system 4 also includes a reception channel Cn associated through a TR switch with said transducer elements 3, the TR switch allowing in particular to protect the reception part, the echo signal received being a low-voltage signal while the transmission signal is a high-voltage signal. The reception channel Cn is repeated for each transducer element 3 and includes, in cascade, a Low Noise Amplifier (LNA), a variable-gain block TGC suitably controlled by means of a controller, a Programmable Gain Amplifier (PGA), an analog-to-digital converter (ADC), an adder, and a reception beamformer device that re-phases the digitalized echo signals received by the probe.

In the linear array probe 6, the electronic circuitry is maintained outside the probe itself, and all the transducer elements 3 are each coupled to the computer of the displaying system 5 through a respective coaxial cable 8, as shown in FIG. 2.

The transducer elements 3 and the corresponding coaxial cables 8 are of a number N between approximately 100 and 200, generally equal to about 130. The coaxial cables 8 are provided with the length of about two meters.

The echo signals coming from a single point A are received by the transducer elements 3 in a delayed way with respect to each other, with a different delay in relation to the distance that the echo signal must cover to reach a respective transducer element.

For a correct reconstruction of the image, a delay compensation between the acoustic signals sent by the transducer elements 3 is performed.

As shown in FIG. 3, the peak of the echo signal received shows a phase shift at the time level which is in relation to the angle α subtended with respect to the transducer element having the shortest path.

The acoustic signals are suitably digitalized and re-phased in the digital circuits of the beamformer device 7 so as to reconstruct the image correctly.

For improving the performances and obtaining 3D echographic images, it is known to use matrix probes 2, which include a matrix 10 of transducer elements 3, shown for example in FIG. 4, with a number N' of transducer elements 3 between approximately 1000 and 8000. Such a matrix probe 2 allows a compensation of the echo signals received on both the axes of the matrix and allows a display of 3D images.

As schematically shown in FIGS. 5A and 5B, the matrix probe 2 can be realized with a multilayer semiconductor structure wherein the associated layers are coupled through conductive vias, realizing, in correspondence with a surface of the structure, thousands of transducer elements 3 electrically coupled to each other and in correspondence with the opposed surface to the electronic circuitry. This matrix probe 2 improves the performances by allowing a compensation of the echo signals on both the axes of the matrix so as to obtain a 3D image.

The transducer elements 3 of the matrix 10 are suitably grouped in sub-matrixes 21, rectangular or squared of sizes, for example equal to (2×2), (3×3) or (6×6), so as to pre-process the echo signals received and reduce to only about one hundred the number of coaxial cables 8 sent to the displaying system 5.

Coming back to FIG. 4, the matrix probe 2 includes a portion of circuitry including in turn for each transducer element 3 a respective reception channel Cn. Each reception channel Cn includes a TR switch SW and a low noise amplifier LNA placed in cascade with each other and coupled to a beamformer device 12.

The beamformer device 12, as shown in FIG. 6, includes a plurality of storage cells 14 arranged in second re-phasing matrices 15, each second re-phasing matrix 15 being associated with a corresponding sub-matrix 11 of transducer elements 3. Each row Ri of the second re-phasing matrix 15 is associated with one of said transducer elements 3 through the reception channel Cn.

Each cell 14 of the beamformer device 12, shown in FIG. 7, includes a capacitor C, which is interposed between a ground terminal coupled to a ground gnd and an input terminal In, which is coupled to the output of the low noise amplifier with variable gain and which receives the acoustic signal through a writing switch S1 driven by a writing signal "write" (or "wr"). A reading switch S2 driven by a reading signal "read" (or "rd") allows generating an output signal Out on the basis of the charge value stored in the capacitor C.

According to the embodiment of FIG. 6, a selector 18 generates the writing signal wr and the reading signal rd for driving respectively the writing switch S1 and the reading switch S2 of each cell 14. The reading switch S2 of each storage cell 14 is coupled to a single buffer 16 through a respective column terminal Tri.

In a conventional system there is a writing step by column of the second re-phasing matrix 15 of storage cells 14. In particular, on the basis of the delay of the echo signal received in the rows of the second re-phasing matrix, a representation of the echo signal is stored in cells of successive columns. The conventional system then provides a reading step that allows generating the output signal Vout corresponding to a same echo signal received by activating suitable storage cells 14 which belong to successive columns Coi of the second re-phasing matrix 15, in a predetermined way.

An embodiment shown in FIGS. 8-11 represents four channels C1-C4 and four focusing points, indicated with A, B, C and D while the numbers indicate the successive sequences of time.

At time 1, shown in FIG. 8, the first and the second transducer element 3 receive the echo signal from point A and generate in the respective channel, C1 and C2, an acoustic signal which is first amplified and then stored in the cells 14 of the first column Co1 of the second re-phasing matrix 15. This first column Co1 is completely activated by the selector 18 at the time 1 through the writing signal wr.

At time 2, shown in FIG. 9, with a certain delay, the third and the fourth transducer element 3 receive the echo signal from point A, and generate in the respective channel, C3 and C4, an acoustic signal which is stored by the cells 14 indicated with 2A of the second column Coi completely activated by the selector 18. Simultaneously, the first and the second transducer 3 receive the echo signal from point B and generate the acoustic signal which is stored in the cells 14 activated and indicated with 2B of the second column Coi.

At time 3, shown in FIG. 10, the third and the fourth transducer elements 3 receive the echo signal from point B and generate a respective acoustic signal which is stored in the cells 14 indicated with 2B of the third column Coi completely activated by the selector 18. Simultaneously, the first and the second transducer elements 3 receive the echo signal from point C and generate the acoustic signal, which is stored in the cells 14 indicated with 3C of the third column Coi.

Similarly, at time 4, shown in FIG. 11, the third and the fourth transducer elements 3 generate the acoustic signal corresponding to the echo signal of point C, which is stored in the respective cells 14 of the fourth column Coi and indicated with 4C, where the column is activated by the selector 18. Simultaneously, the first and the second transducer elements 3 receive the echo signal from point D, and they generate the corresponding acoustic signal which is stored in the cells 14 indicated with 4D of the fourth column Coi activated, and so on.

The cells 14 indicated with 1A and 2A are then read, respectively in the first column Co1 and in the second column Co2, for representing the signal generated by point A, and the cells 14 indicated with 2B and 3B respectively in the second column Coi and in the third column Coi are read for representing to the signal generated by point B, and so on.

This system, although advantageous under several aspects, has the drawback of a rather laborious and complex reading step, which includes activating cells that belong to two or more columns of the second re-phasing matrix for representing the echo signals coming from the same focusing points. The activating cells of different columns indicates that the output terminal of each cell is coupled to a single column terminal Tri. Since the second re-phasing matrix 15 occupies a certain area in an integrated circuit, the column terminal Tri is constituted by a rather long metallization wire, and this indicates a significant parasitic capacitance associated with said terminal. The parasitic capacitance may worsen the signal-to-noise ratio, thus possibly degrading the performance of the system.

SUMMARY

An embodiment includes a system and a corresponding control method for decreasing the complexity of the reading step of the storage cells with a circuit simplification that allows reducing the parasitic capacitance, in particular the parasitic capacitance associated with the column terminal Tri, that speeds up the reading and writing operations, and that has such structural and functional characteristics as to overcome the limits still affecting at least some conventional systems and processes.

An embodiment is a modified circuit structure of the second re-phasing matrix and the storage of the echo signals coming from said focusing points, and improving the signal-to-noise ratio of the beamformer device through the reduction of the parasitic capacitance of the interconnections.

An embodiment includes a 4D data ultrasound imaging system including a first matrix of transducer elements suitable for transmitting and for receiving ultrasound signals, said transducer elements being divided into sub-matrices and being suitable for receiving a same acoustic signal in a delayed way, a plurality of reception channels with each one of said reception channels associated with a respective one of said transducer elements, a beamformer device including a plurality of storage cells arranged in second re-phasing matrices, each second re-phasing matrix being associated with a corresponding sub-matrix with each row associated with a respective one of said transducer elements, said storage cells including an input storage stage that is selectively associated with a row and an output reading stage that is selectively associated with a buffer; wherein each storage cell that belongs to a same column has said input storage stage that is dynamically activated in sequential times with respect to another storage cell of the same column for storing said same delayed acoustic signal, said storage cells belonging to the same column have said respective output reading stage simultaneously activated.

Suitably, each storage cell of said same column may be activated singularly with respect to each other storage cell of said same column.

The system may include a selector block which emits writing signals and reading signals suitable for driving respectively said input stage and said output stage of each of said storage cells.

Suitably, each of said storage cells may include a capacitor interposed between an inner node and a reference terminal associated with a reference voltage, a writing switch interposed between an input terminal and said inner node suitable for defining said input stage, and a reading switch interposed between said inner node and an output terminal suitable for defining said output stage.

Moreover, the storage cells that belong to a same column may have said output terminal associated with a single terminal column, which is associated through a corresponding selection switch with said buffer.

Each of said storage cells may include a reset switch coupled to said inner node and said reference terminal. In particular, the reset switches of said storage cells that belong to a same column are driven by a single reset signal.

The selector block of the system may include first shift registers, with each first shift register associated respectively with one of said rows for transporting said writing signals, a second shift register for transporting said reading signals, and a third shift register for transporting said reset signals.

An embodiment includes a process for controlling a 4D data ultrasound imaging system including a first matrix of transducer elements suitable for transmitting and for receiving ultrasound signals, said transducer elements being divided into sub-matrices which receive in a delayed way a same ultrasound signal, a plurality of reception channels with each reception channel associated with a respective transducer element, a beamformer device including a plurality of storage cells arranged in second re-phasing matrices, each second re-phasing matrix being associated with a corresponding sub-matrix with each row associated with a respective one of said transducer elements, said storage cells including an input storage stage driven for being associated with a row and an output reading stage driven for being associated with a buffer; said method further including:
  a writing-by-row step by driving selectively in sequential times the input storage stage of each storage cell that belongs to a same column with respect to another storage cell of the same column for storing in said storage cells of said same column said same delayed acoustic signal received in said rows;
  a reading-by-column step by driving simultaneously said output stage of said storage cells that belong to a same column.

Suitably, said writing-by-row may activate said input storage stage of each storage cell of said same column singularly with respect to each other storage stage of said storage cells of said same column.

The process may include a step of driving said input storage stage and said output reading stage of each of said storage cells by means respectively of writing signals and reading signals emitted by a selector block.

The process may arrange a reset switch in each of said storage cells and provide a reset step by driving with a single reset signal said reset switches of said storage cells that belong to a same column.

Suitably, a process arranges first shift registers in said selector block for transporting said writing signals by arranging one of said shift registers for each of said rows of said second matrix, and a second shift register is arranged for transporting said reading signals.

Features of one or more embodiments will be apparent from the following description given by way of indicative and non-limiting example with reference to the drawings.

BRIEF DESCRIPTION OF THE DRAWINGS

FIG. 2 is a side schematic view, partially in section, of an ultrasound probe employed in an apparatus of FIG. 1;

FIG. 3 shows the reception in different times of a same echo signal in a probe with array transducer elements;

FIG. 7 is a schematic view of a storage cell of a re-phasing matrix;

FIGS. 8-11 show a schematic view of four sampling sequences realised according to a conventional method;

DETAILED DESCRIPTION

Figure 1:
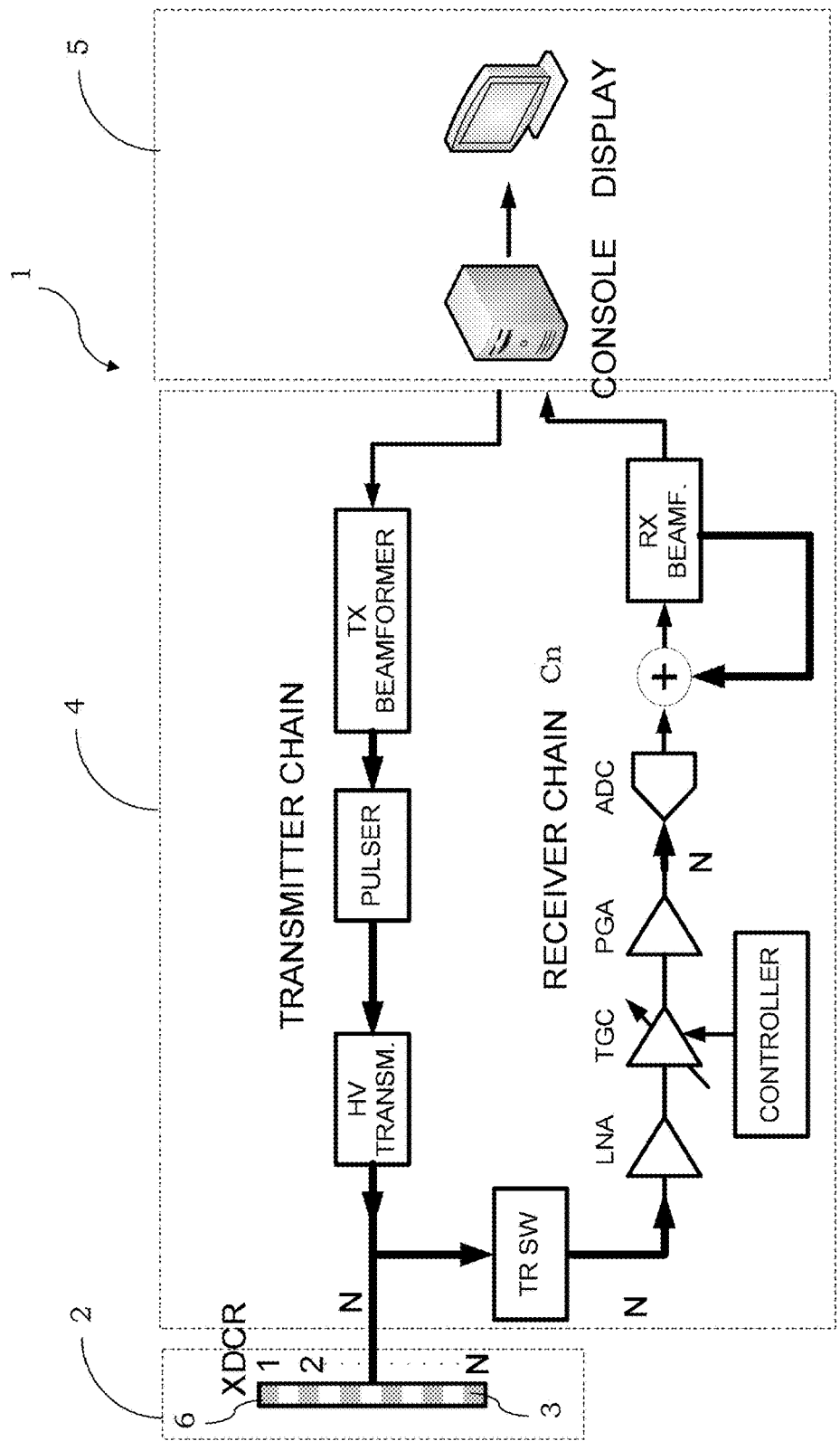
FIG. 1 shows, with a block scheme, an ultrasound imaging system.
Figure 5B:
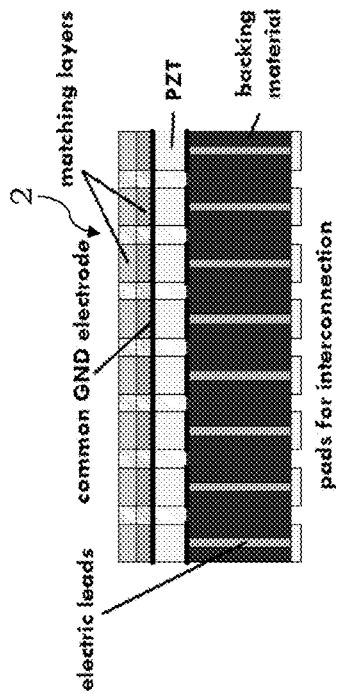
FIGS. 5A and 5B respectively show a three-quarter top view and a schematic, cross-section view of a matrix of transducer elements employed in a matrix probe.
Figure 5A:
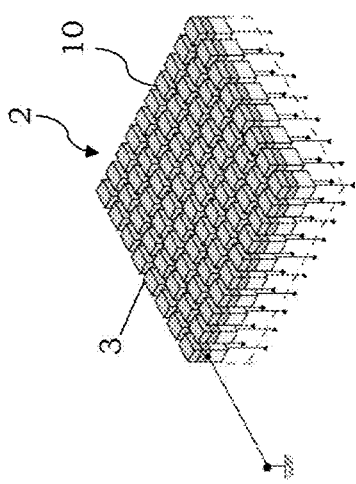
Figure 4:
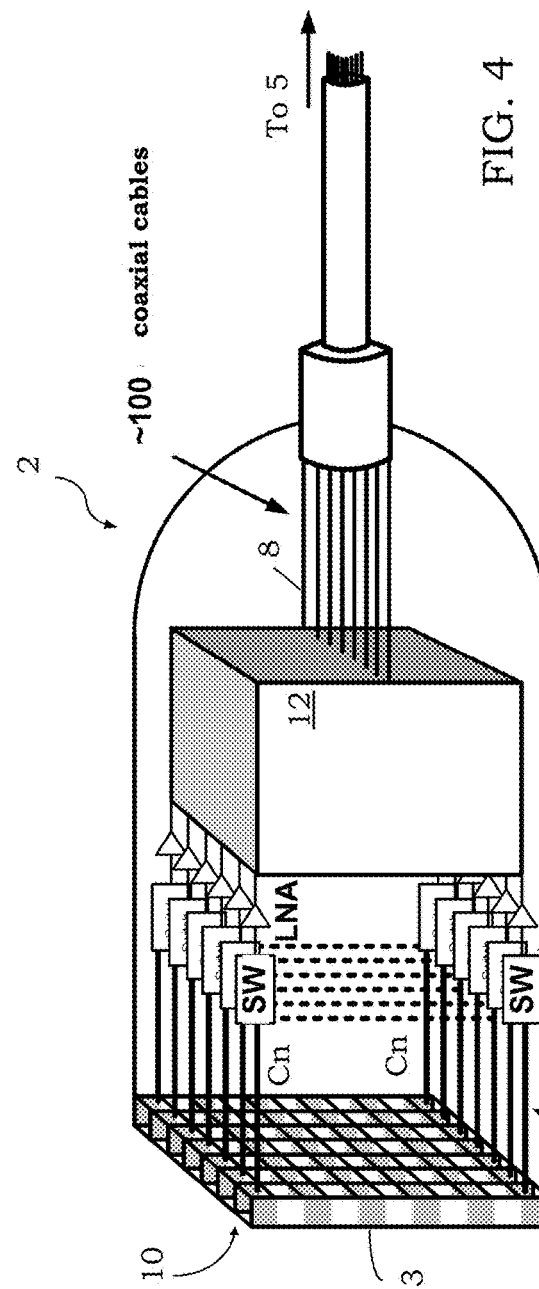
FIG. 4 shows a side schematic view, partially in section, of an ultrasound probe including a matrix of transducer elements.
Figure 6:
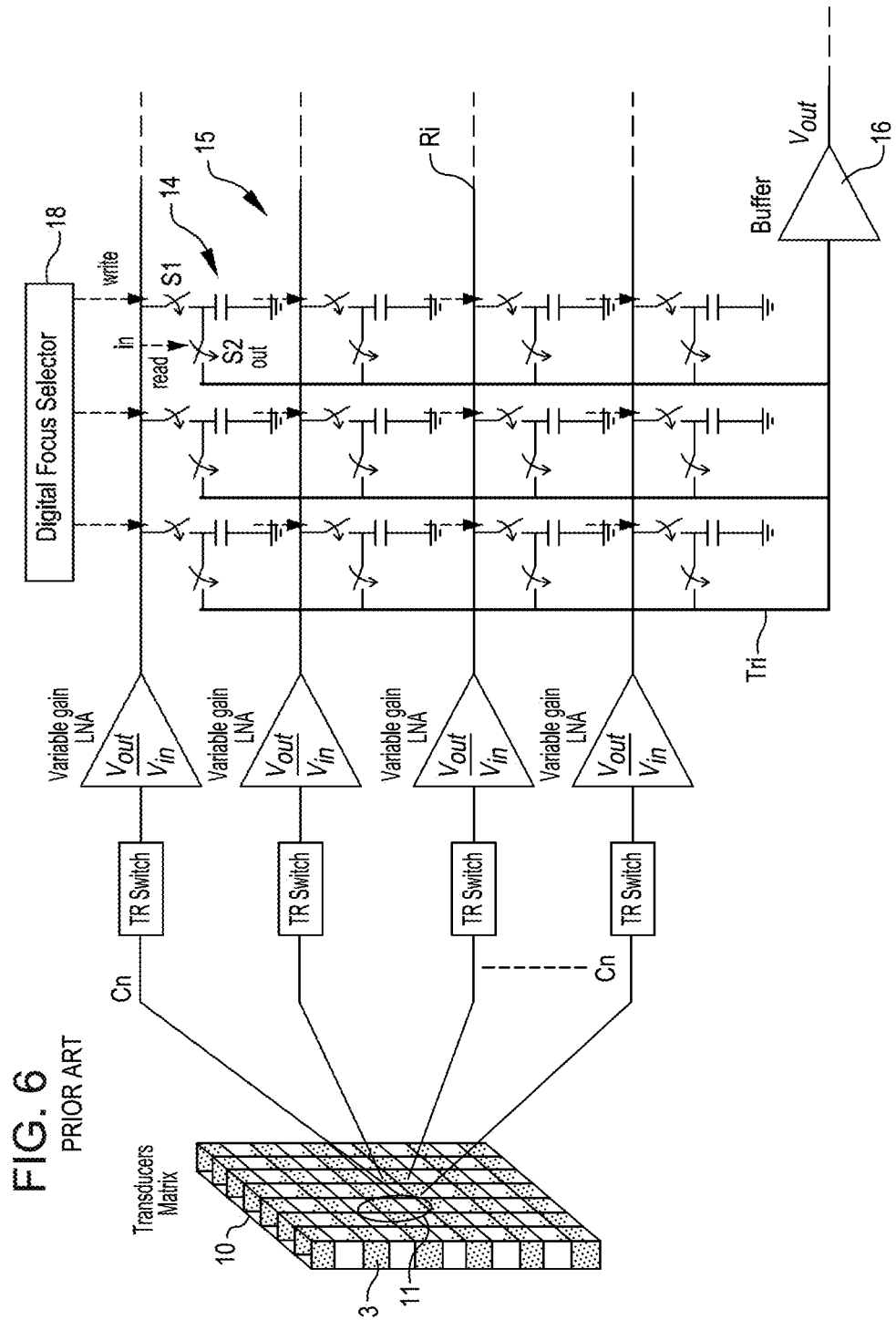
FIG. 6 shows a schematic view of a conventional re-phasing matrix of storage cells coupled to N reception channels and to respective transducer elements.
Figure 12:
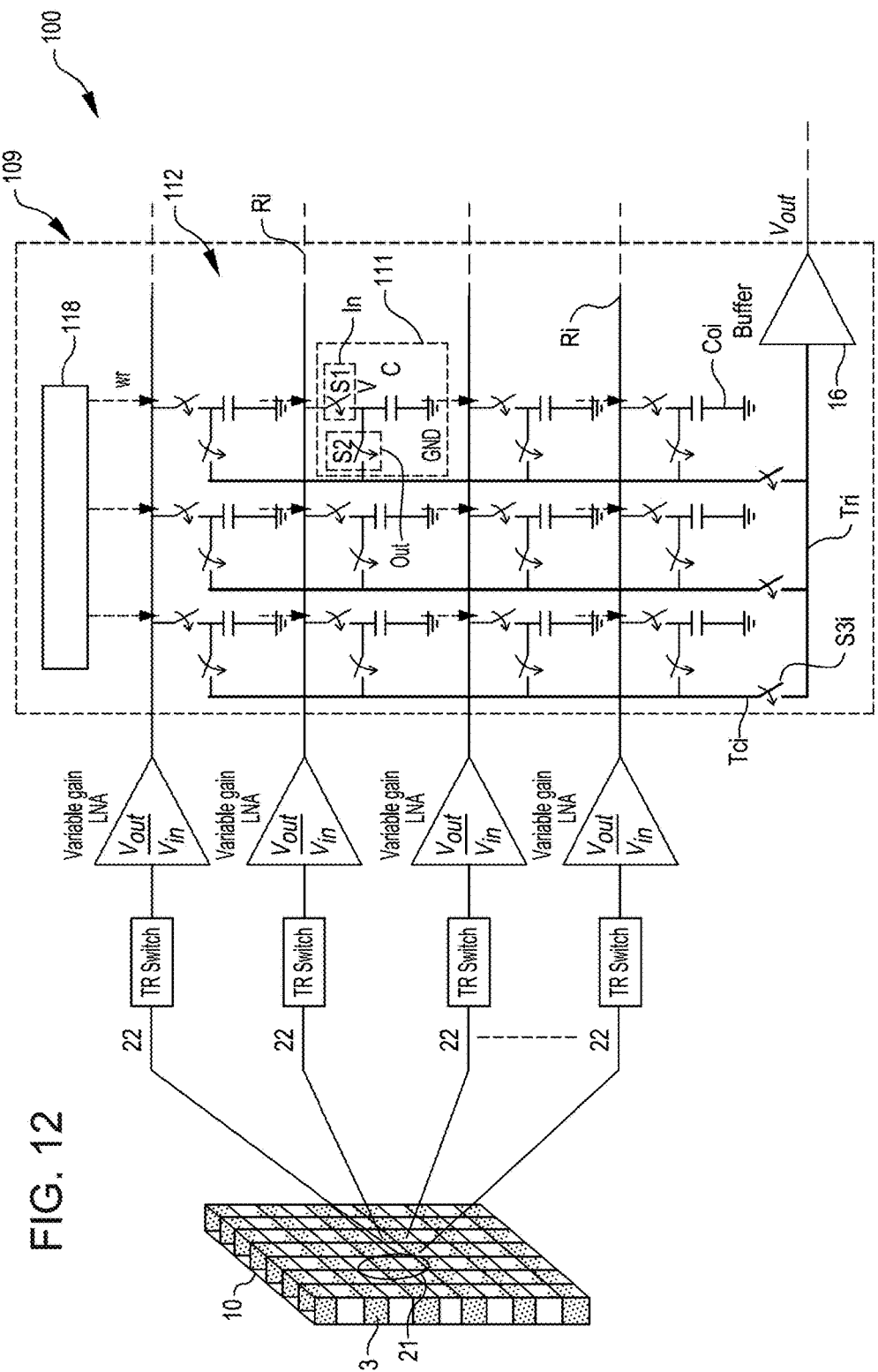
FIG. 12 shows a schematic view of a portion of a second re-phasing matrix of storage cells coupled to N reception channels and to respective transducer elements, according to an embodiment.

With reference to the figures, and in particular to FIG. 12, 100 globally and schematically indicates a portion of a 4D data ultrasound imaging system, where 4D means 3D images in real time.

In the following description reference will be made to the previously described system and details and cooperating parts having the same structure and function will be indicated with the same numbers and reference acronyms.

The system 100 includes a matrix 10 of transducer elements 3 suitable for transmitting and for receiving ultrasound signals. The transducer elements 3 being divided into sub-matrices 21 suitable for receiving, delayed in time, a same echo signal transmitted by or from a same focusing point.

Each transducer element 3 is associated through a reception channel 22 with a beamformer device 109 or re-phasing device.

In particular, the beamformer device 109 includes a plurality of re-phasing matrices 112 each including a plurality of storage cells 111.

Moreover, each re-phasing matrix 112, divided into rows Ri and columns Coi, is associated with a corresponding sub-matrix 21 of transducer elements 3. In particular, each row Ri of each re-phasing matrix 112 is associated with a respective one of said transducer elements 3 through the corresponding reception channel 22. Each reception channel 22 includes a respective TR switch and a respective variable-gain low-noise amplifier LNA placed in cascade with each other between the transducer element 3 and the re-phasing matrix 112.

The number of the rows Ri of the re-phasing matrix 112 is equal to the number of the transducer elements 3 of the sub-matrix 21, while the number of the columns Coi is equal to the number of echo signals received by the transducer elements 3 and is in relation to the number of acoustic signals sent through the transducer elements 3, which are variable and defined in the design step.

Each storage cell 111 includes an input storage stage In that is associated with a row Ri of the re-phasing matrix 112 and an output reading stage Out that is associated with a buffer 16.

Each storage cell 111 that belongs to a same column Coi has the input storage stage In which is activated dynamically in sequential times with respect to another storage cell 111 of the same column Coi for storing the same acoustic signal received in a delayed way in said transducer elements 3 of the sub-matrix 21 from a same focusing point. In this way, a same echo signal received delayed in each transducer element 3 of the sub-matrix 21 is stored in the storage cells 111 of the re-phasing matrix 112 that belongs to the same column Coi.

Moreover, suitably, the storage cells 111 that belong to a same column Coi have the output stage Out which is simultaneously activated.

Each storage cell 111 of said same column Coi is activated singularly with respect to each other storage cell 111 of the same column Coi.

In particular, each storage cell 111 includes a capacitor C interposed between an inner node V and a reference terminal associated with a reference voltage, that in an embodiment is with ground voltage GND, a writing switch S1 interposed between an input terminal and the inner node V suitable for defining the input stage In, and a reading switch S2 interposed between the inner node V and an output terminal suitable for defining the output stage Out.

The storage cells 111 belonging to a same column Coi of the re-phasing matrix 112 have the output terminal associated with a corresponding column terminal Tci, which is in turn associated through a selection switch S3i with a row terminal Tri coupled to the interface element or buffer 16. In this case, the buffer 16 interfaces the inner signals of the beamformer device 109 with the external cables, decoupling the sensitive node, i.e. the row terminal Tri, from the load capacitance.

The system 100 also includes a selector block 118 that emits writing signals wr and reading signals rd suitable for driving, respectively, the input stage In and the output stage Out of each of the storage cells 111 of the re-phasing matrix 112.

In particular, the selector block 118 drives the writing switch S1 of each storage cell 111 belonging to a same column Coi in sequential times and in a predetermined way, thus allowing to store in the same column Coi the same acoustic signal received in a delayed way by the transducer elements 3 according to the delayed reception time.

The selector block 118 drives instead with the same reading signal rdi the reading switches S2 of all the storage cells 111 belonging to the same column Coi and also the selection switch S3i of the respective column terminal Tci for generating the output signal Vout corresponding to the respective echo signal.

In other words, there is a storage of the storage cells 111 by column Coi in successive times that allows a reading of the same acoustic signal corresponding to the echo signal by column Coi.

The example shown in FIGS. 13-16 shows an array of transducer elements 3 of a submatrix 21 associated through four respective reception channels 22 with a re-phasing matrix 112 of storage cells 111, thus there are four focusing points, indicated with A, B, C and D, which receive respective acoustic signals and emit respective echo signals, while the numbers indicate the successive sequences of time.

Figure 13:
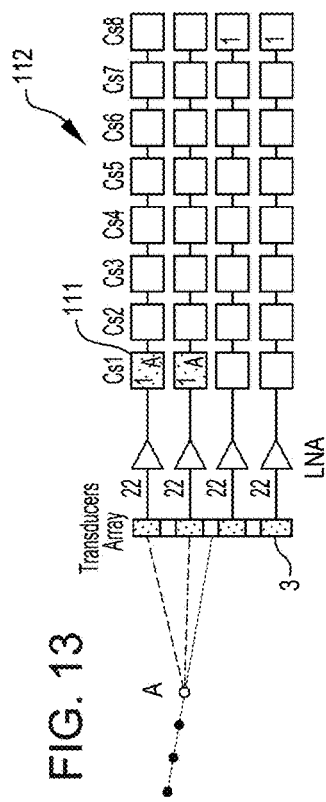

At time 1, shown in FIG. 13, the first and the second transducer elements 3 receive the echo signal from point A and generate in the respective reception channel 22 an acoustic signal which is first amplified and then stored in the respective storage cells 111 of the first column Co1 of the re-phasing matrix 112, which storage cells are activated in a selective way by the selector block 118 through the writing signal wr.

Figure 14:
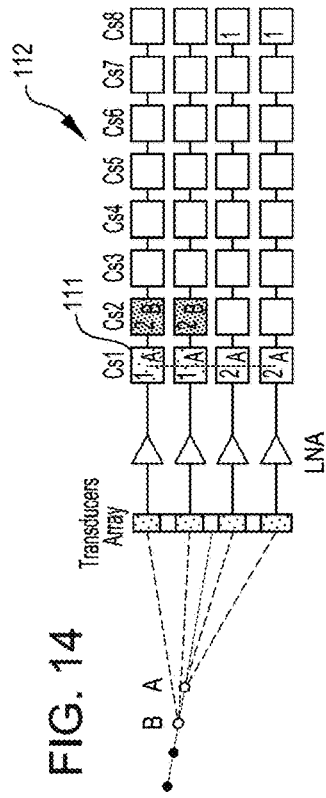
FIGS. 13-16 show a schematic view of four sampling sequences realised according to an embodiment.

At time 2, shown in FIG. 14, with a certain delay with respect to time 1, the third and the fourth transducer elements 3 receive the echo signal from point A and generate in the respective reception channel 22 an acoustic signal which is stored by the storage cells 111 indicated with 2A of the first column Co1 activated by the selector block 118. Simultaneously, the first and the second transducer elements 3 receive the echo signal from point B and generate the acoustic signal, which is stored by the storage cells 111 of the second column Co2 indicated with 2B.

In this way, differently from the prior art, the acoustic signal corresponding to the echo signal from the same point is stored in storage cells 111 of the same column Coi.

Figure 15:
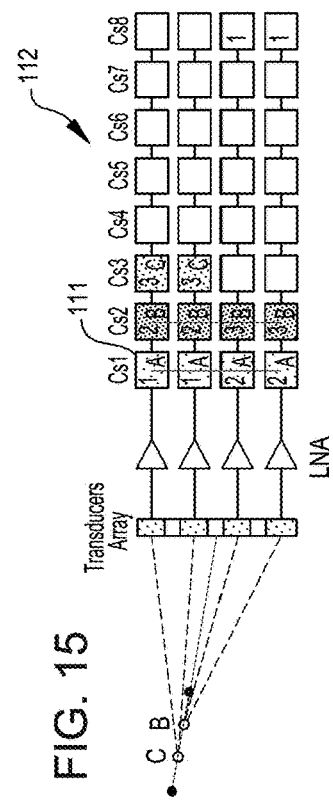

At time 3, shown in FIG. 15, the third and the fourth transducer elements 3 receive the echo signal from point B and generate a respective acoustic signal which is stored by the storage cells 111 of the second column Co2 indicated with 2B. Simultaneously, the first and the second transducer elements 3 receive the echo signal from point C and generate the acoustic signal which is stored by the storage cells 111 of the third column Co3 and indicated with 3C.

Figure 16:
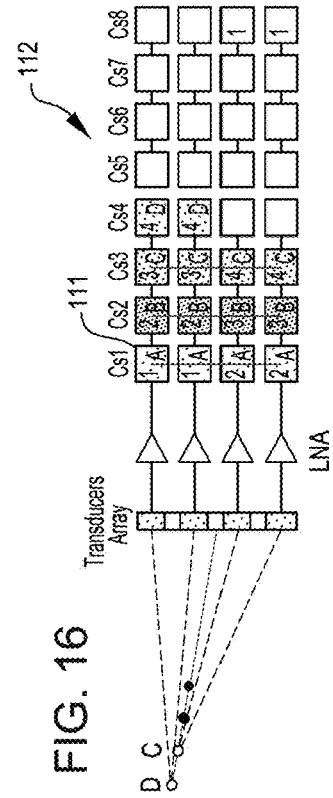

Similarly, at time 4, shown in FIG. 16, the third and the fourth transducer elements 3 generate the acoustic signal corresponding to the echo signal of point C which is stored in the respective storage cells 111 of the third column Co3 and indicated with 4C. Simultaneously, the first and the second transducer elements 3 receive the echo signal from point D, and generate the corresponding acoustic signal which is stored by the storage cells 111 of the fourth column Co4 indicated with 4D. And so on.

The storage cells 111 are then read in a same column Coi, for generating a representation of (or a recovered version of) the echo signal generated by a same focusing point A, B, C and D. Successive columns allow reading in sequence the acoustic signals received from different focusing points.

Naturally, the storage cells 111 of each column Coi can be activated in a dynamic way and then the acoustic signal can be stored in storage cells 111 belonging to different sequences or rows inclinations, although predetermined according to the transducer elements 3 that in sequence receive the echo signal. A single storage cell 111 in each row may always remain active for maintaining a load constant at the low-noise variable-gain amplifier LNA.

According to an embodiment, each storage cell 111 of a same column Coi of the re-phasing matrix 112 is activated singularly with respect to each other storage cell 111 of said same column Coi.

Figure 17:
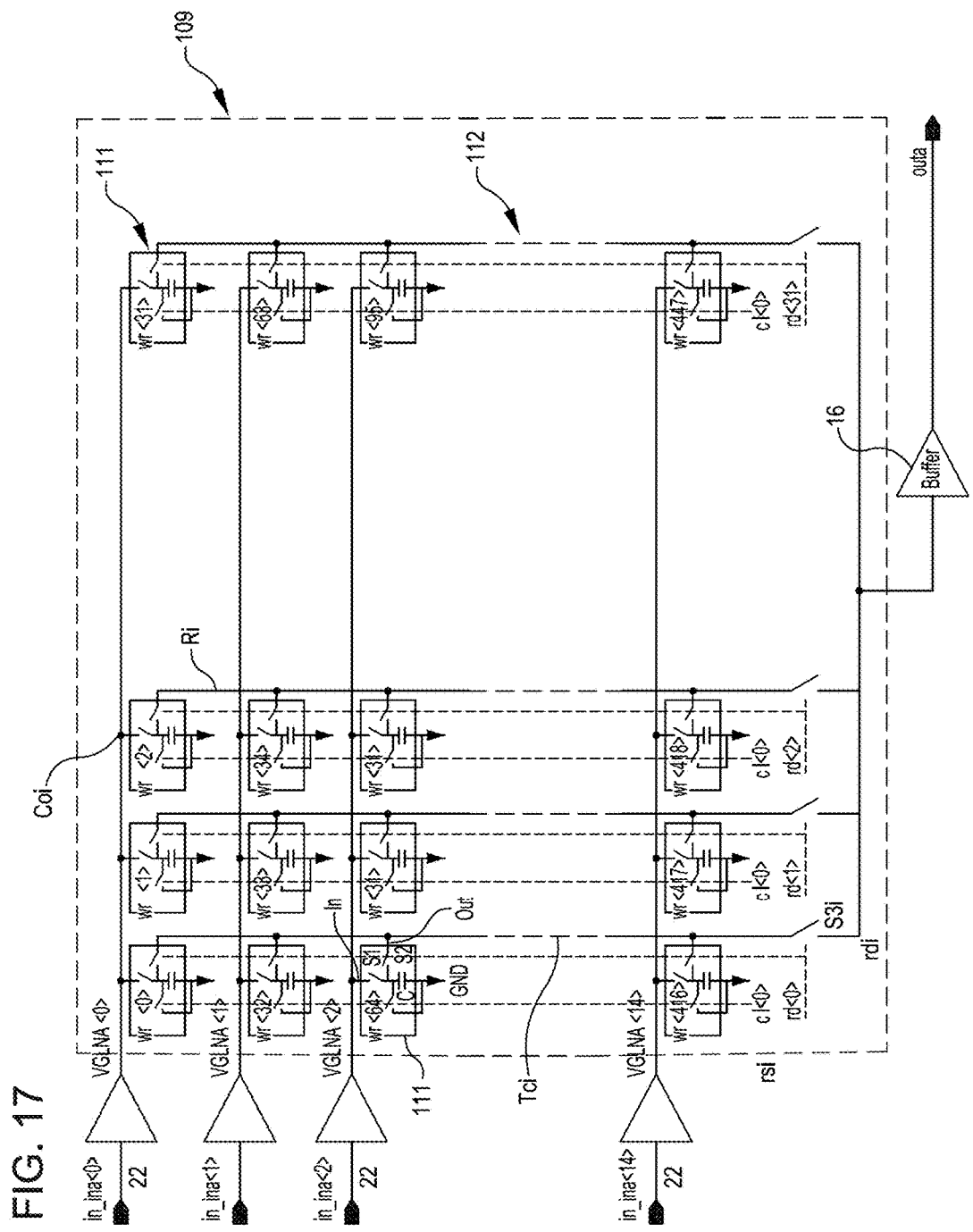
FIG. 17 shows, in another embodiment, the second re-phasing matrix of storage cells of FIG. 16.

In an embodiment shown in FIG. 17, the system 100 includes the re-phasing matrix 112 with each storage cell 111 including a reset switch S4 interposed between the inner node V and the ground terminal GND, which allows resetting each storage cell 111 prior to a successive storage.

The reset switches S4 of the storage cells 111 belonging to a same column Coi are driven by a single reset signal rs generated by the selector block 118.

Figure 18:
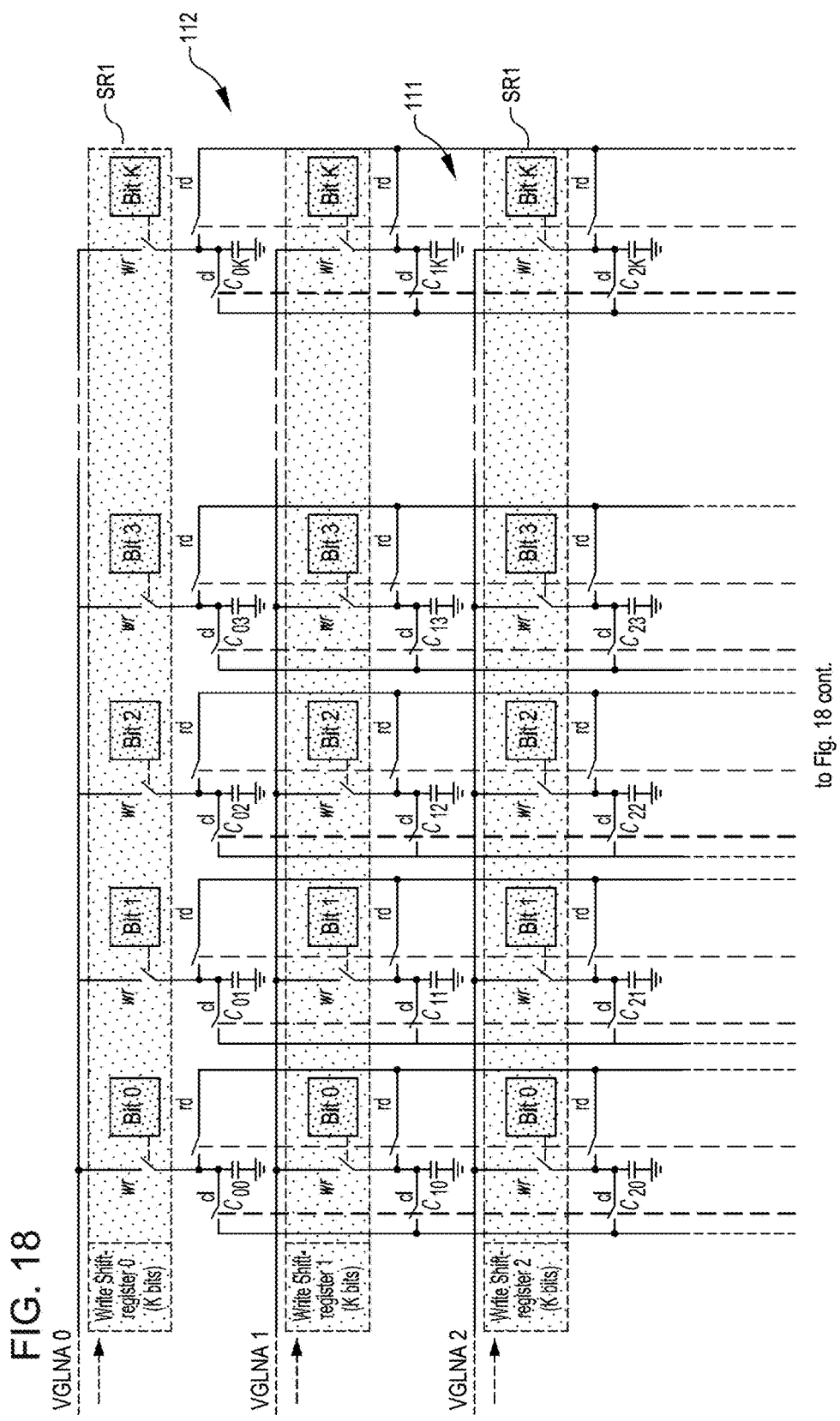
FIG. 18 shows, in another embodiment the second re-phasing matrix of storage cells of FIG. 16.

In an embodiment shown in FIG. 18, the beamformer device 109 includes the selector block 118 realized by means of first shift registers SR1, which transport said writing signals wr suitable for driving said writing switches S1 of the storage cells 111. In particular, each of said first shift registers SR1 is placed in correspondence with each row Ri of the re-phasing matrix 112. The beamformer device 109 also includes a second shift register SR2 for transporting the reading signals rd of each column Coi and a third shift register SR3 for the possible reset signals rs suitable for driving the reset switches S4 by column Coi.

An embodiment also relates to a process for controlling a 4D data ultrasound imaging system, where 4D means 3D images in real time.

In the following description reference will be made to the system previously described and details and cooperating parts having the same structure and function will be indicated with the same numbers and reference acronyms.

An embodiment of the system 100, as shown in FIG. 12, includes a matrix 10 of transducer elements 3 suitable for transmitting and for receiving ultrasound signals. These transducer elements 3 being divided into sub-matrixes 21, which receive in a delayed way a same ultrasound signal.

The system 100 also includes a plurality of reception channels 22 each associated with a respective transducer element 3, and a beamformer device 109 including a plurality of storage cells 111 arranged in re-phasing matrices 112.

Each second re-phasing matrix 112 being associated with a corresponding sub-matrix 21 of transducer elements 3, with each row Ri associated with a respective one of said transducer elements 3 through the respective reception channel 22.

Each storage cell 111 includes an input stage In, driven by a corresponding writing signal wr, for being associated with a row Ri, and an output stage Out, driven by a corresponding reading signal rd, for being associated with a buffer 16.

An embodiment includes a writing-by-row driving selectively, in sequential times, the input storage stage In of each storage cell 111 belonging to a same column Coi with respect to another storage cell 111 of the same column Coi, for storing in said storage cells 111 of said same column Coi the same delayed acoustic signal received in said rows Ri. The writing step couples to each row Ri the input storage stage In of one or more storage cells 111 belonging to the same column Coi.

Moreover, an embodiment includes a reading-by-column step by simultaneously driving the output stage Out of the storage cells 111 belonging to a same column Coi. In this way, the output signal Vout is generated corresponding to said same delayed acoustic signal received in said rows Ri by activating the storage cells 111 belonging to a same column Coi.

The writing signal wr, which allows driving the input stage In of each storage cell 111, and the reading signal rd, which allows driving the output stage Out of each storage cell 111, are emitted by a selector block 118. In particular, the writing signals wr for the storage cells 111, belonging to a same column Coi, are emitted in sequential times suitably predetermined in the process step.

In the example shown in FIGS. 13-16, four transducer elements 3 associated with respective reception channels 22 and four focusing points indicated with A, B, C and D are represented while the numbers indicate the successive time sequences.

At time 1, shown in FIG. 13, the first and the second transducer elements 3 receive the echo signal from point A and generate an acoustic signal which is first amplified and then stored in the respective storage cells 111 of the first column Co1 of the re-phasing matrix 112, which cells are activated in a selective way by the selector block 118 generating the corresponding writing signals wr.

At time 2, shown in FIG. 13, with a certain delay, the third and the fourth transducer element 3 receive the echo signal from point A while the first and the second transducer elements 3 receive the echo signal from point B, the selector block 118 generates the corresponding writing signals wr for activating the storage cells 111 of the third and fourth row Ri belonging to the first column Co1 and the writing signals wr for activating the storage cells 111 of the first and second row belonging to the second column Co2. And so on.

In this way, differently from at least some conventional techniques, the acoustic signal corresponding to the echo signal from the same focusing point A, B, C or D, is stored in storage cells 111 of the same column Coi.

Therefore, a sequential reading step of the columns of the re-phasing matrix 112 allows reading in sequence the acoustic signals received.

In an embodiment shown in FIG. 17, the system 100 includes the second re-phasing matrix 112 with each storage cell 111 including a reset switch S4 that allows resetting each storage cell 111 prior to a successive storage.

An embodiment then includes a reset step by driving to all the reset switches S4 of the storage cells 111 belonging to a same column Coi with a single reset signal rs.

In an embodiment shown in FIG. 18, the process drives the input storage stages In of the storage cells 111 suitably associated with the rows Ri of the re-phasing matrix 112, by means of first shift registers SR1 where the control bits flow.

The embodiment also includes a second shift register SR2 for transporting second control bits of the reading signals rd for driving the output stages Out of the storage cells 111. An embodiment provides a single bit and a single terminal for activating the output stages Out of the storage cells 111 of a same column Coi. Furthermore, differently from at least some conventional techniques, the number of first shift registers SR1 is equal to the rows Ri of the re-phasing matrix 112 while a single second shift register SR2 is requested for reading the storage cells 111 of the re-phasing matrix 112.

An embodiment of a process can also provide that the reading signal rd can drive the selection switch S3i of the respective column terminal Tci placed at the end of the output metallization of each column, allowing to activate these selection switches S3i only one by one. In this way the parasitic capacitance of the metallizations associated with the other column terminals Tci is not coupled to the input node of the buffer 16.

Moreover, an embodiment can allow realizing a third shift register SR3 for the possible reset signals rs, providing in particular a single bit and a single terminal for activating the reset switches S4 of the storage cells 111 of a same column Coi.

A major advantage of the 4D data ultrasound imaging system according to an embodiment is that of improving the output signal of the beamformer device, reducing the parasitic capacitance coupled to the input node of the buffer, and increasing the signal-to-noise ratio, thus allowing obtaining a higher resolution.

Another considerable advantage of an embodiment is that to make easy the reading of the echo signal received delayed by the transducer elements by activating the cells that belong to a same column.

Another advantage of an embodiment is the circuit simplicity, relative to the reading of the stored signal.

Another advantage of an embodiment is the reduction of the distortion of the signals due to the fact that only a column of the re-phasing matrix is selected for generating the output signal, remarkably reducing the value of the parasitic capacitances.

Another advantage of an embodiment is the possibility to reset in a simple way by column the cells of the re-phasing matrix that store a same acoustic signal, thus reducing the distortion of the stored signal.

A remarkable advantage of an embodiment is the quickness and the simplicity of the reading step.

Another remarkable advantage of an embodiment is the simplicity of the reset step of the cells that store the same acoustic signal.

One skilled in the art, with the aim of meeting incidental and specific needs, will be allowed to introduce, in the above-described embodiments, several modifications, all of which are within the scope of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
   first and second storage cells arranged in a group of one of a column or a row; and
   a controller coupled to the first and second storage cells and configured
      to cause the first storage cell to store a first value at a first time in response to a first signal generated by a first transducer element in response to a third signal from a location, and
      to cause the second storage cell to store a second value at a second time in response to a second signal generated by a second transducer element in response to the third signal,
      wherein the first time is different than the second time.

2. The apparatus of claim 1 wherein the first and second storage cells each include a respective storage capacitor.

3. The apparatus of claim 1 wherein the controller is configured such that:
   the first time corresponds to a time at which the first transducer receives a portion of the third signal; and
   the second time corresponds to a time at which the second transducer receives the portion of the third signal.

4. The apparatus of claim 1 wherein:
   the first value includes a first voltage level; and
   the second value includes a second voltage level.

5. The apparatus of claim 1 wherein:
   the first signal includes a first electronic signal; and
   the second signal includes a second electronic signal.

6. The apparatus of claim 1 wherein the third signal includes an acoustic signal.

7. The apparatus of claim 1 wherein the third signal includes an ultrasonic signal.

8. The apparatus of claim 1, further comprising the first and second transducers.

9. The apparatus of claim 1, further comprising a transducer array that includes the first and second transducers.

10. The apparatus of claim 1 wherein the controller is configured to reset the first and second storage cells.

11. The apparatus of claim 1, further comprising:
    a first shift register configured to provide, in response to the controller, a fourth signal that causes the first storage cell to store the first value at the first time; and
    a second shift register configured to provide, in response to the controller, a fifth signal that causes the second storage cell to store the second value at the second time.

12. An apparatus, comprising:
    first and second storage cells arranged in a group of one of a column or a row; and
    a controller coupled to the first and second storage cells and configured
       to cause the first storage cell to store a first value at a first time in response to a first signal generated by a first transducer element in response to a third signal from a location,
       to cause the second storage cell to store a second value at a second time in response to a second signal generated by a second transducer element in response to the third signal, and
       to cause the first and second storage cells to provide the first and second values simultaneously to a single read line,
       wherein the first time is different than the second time.

13. The apparatus of claim 12 wherein the first and second storage cells are disposed in a same column.

14. The apparatus of claim 12 wherein the first and second storage cells are disposed in a same row.

15. The apparatus of claim 12, further comprising:
    the first and second transducer elements; and
    the read line.

16. An apparatus, comprising:
    first and second storage cells arranged in a group of one of a column or a row;
    a single read line coupled to the first and second storage cells; and
    a controller coupled to the first and second storage cells and configured
       to cause the first storage cell to store a first value at a first time in response to a first signal generated by a first transducer element in response to a third signal from a location,
       to cause the second storage cell to store a second value at a second time in response to a second signal generated by a second transducer element in response to the third signal, and
       to cause the first and second storage cells to provide the first and second values simultaneously to the single read line,
       wherein the first time is different than the second time.

17. A method, comprising:
    causing a first storage cell to store a first value at a first time in response to a first signal generated by a first transducer element in response to a third signal from a location; and
    causing a second storage cell in a same row or column as the first storage cell to store a second value at a second time in response to a second signal generated by a second transducer element in response to the third signal, wherein the first time is different than the second time.

18. The method of claim 17, further comprising simultaneously reading the first and second storage cells.

19. The method of claim 17, further comprising:
   directing a fourth signal toward the location; and
   wherein the third signal includes a portion of the fourth signal that is redirected from the location.

20. The method of claim 17, further comprising:
   directing a fourth signal toward the location; and
   wherein the third signal includes a portion of the fourth signal that is redirected by an object at the location.

21. The method of claim 17, further comprising:
   generating a fourth signal with at least one of the first and second transducer elements; and
   wherein the third signal includes a portion of the fourth signal that is redirected from the location.

* * * * *